(12) United States Patent
Li

(10) Patent No.: US 6,488,254 B2
(45) Date of Patent: Dec. 3, 2002

(54) MULTI-FUNCTIONAL ADJUSTABLE UMBRELLA BASE

(76) Inventor: Wanda Yiing Li, 3000 S. Ocean Dr. 15C, Hollywood, FL (US) 33019

( * ) Notice: Subject to any disclaimer, the term of this patent is extended or adjusted under 35 U.S.C. 154(b) by 0 days.

(21) Appl. No.: 10/005,748

(22) Filed: Nov. 7, 2001

(65) Prior Publication Data

US 2002/0053631 A1 May 9, 2002

(30) Foreign Application Priority Data

Nov. 8, 2000 (CN) ........................... 00252780 U

(51) Int. Cl.⁷ .............................. F16M 13/00
(52) U.S. Cl. ...................... 248/521; 135/15.1
(58) Field of Search ............... 248/521, 519, 248/511, 539, 131; 135/15.1, 20.1, 20.3

(56) References Cited

U.S. PATENT DOCUMENTS

| | | | | |
|---|---|---|---|---|
| 5,492,301 A | * | 2/1996 | Hauser | 248/523 X |
| 5,647,569 A | * | 7/1997 | Sofy | 248/522 |
| 5,893,547 A | * | 4/1999 | Cohen, Jr. | 248/521 |
| 5,918,849 A | * | 7/1999 | Bliss | 248/523 |

* cited by examiner

Primary Examiner—Ramon O. Ramirez
(74) Attorney, Agent, or Firm—Raymond Y. Chan; David and Raymond Patent Group

(57) ABSTRACT

A multi-functional adjustable umbrella base includes a base support, and a stem rotary arrangement supported by the base support for selectively rotating the supporting stem of an outdoor umbrella and for securely locking up any of its movement. The stem rotary arrangement includes an engaging member rotatably supported by the base support and coaxially connected to the supporting stem of the outdoor umbrella so as to selectively rotate the stem of the outdoor umbrella, a locking member connected to the engaging member for selectively locking the engaging member from being rotated, a paddle operatively connected to the locking member via a connecting arm, and a resilient element mounted on the base support and adapted for normally applying an urging force to the connecting member. In order to unlock the locking member, one has to step down the paddle in order to lift up the engaging portion of the locking member so as to disengage it from the engaging member. Then, the user can be readily to rotate the supporting stem of the outdoors umbrella to a desired orientation.

12 Claims, 4 Drawing Sheets

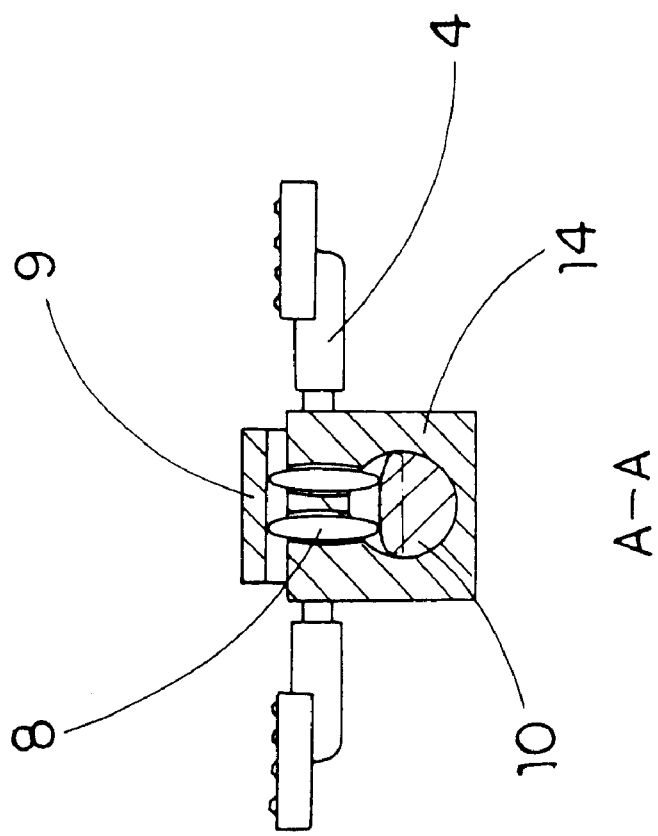

MULTI-FUNCTIONAL ADJUSTABLE UMBRELLA BASE

BACKGROUND OF THE PRESENT INVENTION

1. Field of Invention

The present invention relates to a support, and more particularly to a multi-functional adjustable umbrella base in which a user can be able to selectively adjust the orientation of the umbrella or retain the umbrella in position.

2. Description of Related Arts

Conventional outdoors umbrella or parasol usually comprises a fabric-made awning, an foldable awning supporting frame on which the fabric-made awning is mounted, a supporting stem sildably supporting the fabric-made awning, and a base for firmly holding the supporting stem so that the base and the above elements connected thereon are incapable of flipping over. Conventionally, the supporting stem is rigidly connected to the base without allowing any movement. However, for certain reasons, such as turning the fabric-made awning in a suitable direction, users of the conventional outdoor umbrellas may require that the umbrellas can be rotated while keeping the stability of the whole umbrella intact. Right now, a user may have to detach the whole supporting stem from the base and then remount it to there in a right orientation of the fabric-made awning. But unfortunately, not every supporting stem of outdoor umbrellas can be easily detached and remounted from its base. In worse, the user has to turn the whole umbrella, including its base, to a desired orientation. This practice is very exhaustive and, if handled carelessly, may even cause the whole umbrella to flip over and hit something or somebody nearby.

SUMMARY OF THE PRESENT INVENTION

A main object of the present invention is to provide a multi-functional adjustable base for an outdoor umbrella which allows the stem of the umbrella can be selectively rotated to an desired orientation or locked up in position, while keeping the stability of the outdoor umbrella intact.

Another object of the present invention is to provide a multi-functional adjustable base for an outdoor umbrella which is simple in structure, easy to operate, and does not require to alter significantly the original shape and structure of the outdoor umbrella.

Accordingly, in order to accomplish the above objects, the present invention provides a multi-functional adjustable base for an outdoors umbrella having a supporting stem, comprising:

a base support; and a stem rotary arrangement, which comprises:
  an engaging member rotatably supported on the base support and firmly connected to the supporting stem of the outdoor umbrella;
  a locking member supported on the base support and has a engaging portion adapted for selectively engaging with a bottom portion of the engaging member;
  means for selectively engaging and disengaging the engaging member with the locking member; and
  a paddle operatively connected to the locking member and adapted to be shifted in a locked position and an unlocked position, wherein in the locked position, the locking member is firmly engaged with the engaging member so as to restrict a rotational movement of the engaging member, and wherein in the unlocked position, the locking member disengages with the engaging member so that the engaging member is capable of freely rotating.

BRIEF DESCRIPTION OF THE DRAWINGS

FIG. 4 is a partially sectional side view of the operation housing of the multi-functional adjustable umbrella base according to the above second preferred embodiment of the present invention.

DETAILED DESCRIPTION OF THE PREFERRED EMBODIMENT

Figure 1:
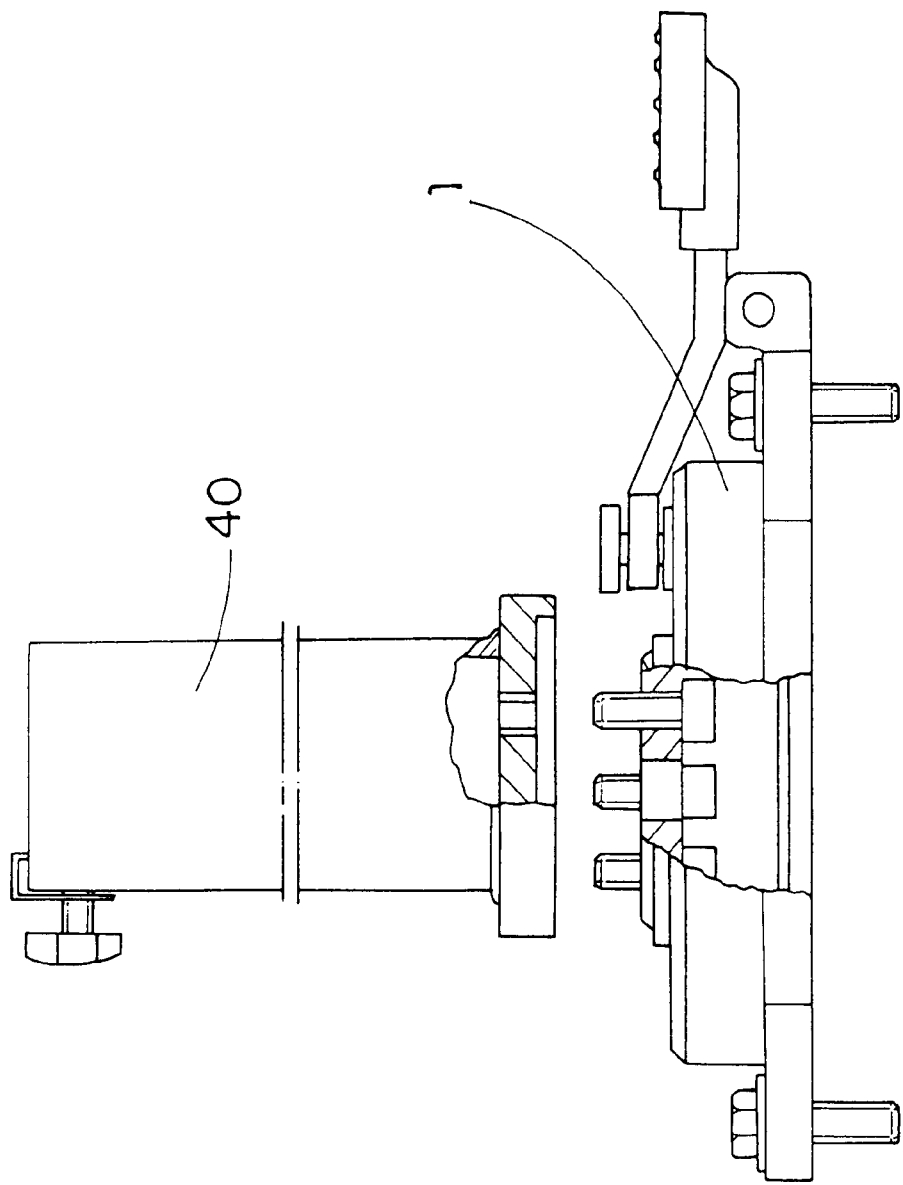
FIG. 1 is a partially sectional side view of a multi-functional adjustable umbrella base according to a first preferred embodiment of the present invention.

Referring to FIG. 1 of the drawings, a multi-functional adjustable umbrella base according to a first preferred embodiment of the present invention is illustrated. According to the first preferred embodiment of the present invention, the multi-functional adjustable umbrella base comprises a base support 1, and a stem rotary arrangement 2 supported by the base support 1 for selectively rotating the supporting stem 40 of an outdoor umbrella and for securely locking up any of its movement.

Figure 2:
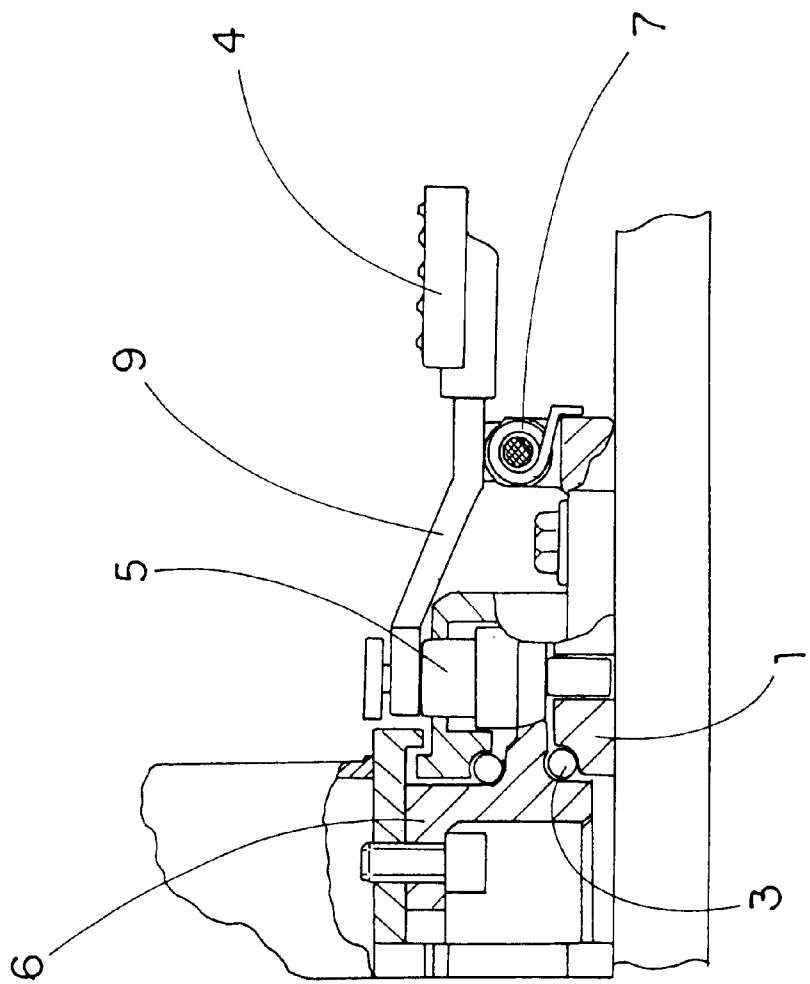
FIG. 2 is a partially sectional side view of a stem rotary device according to the above first preferred embodiment of the present invention.

Referring to FIGS. 1–2 of the drawings, the stem rotary arrangement 2 comprises an engaging member 6 rotatably supported by the base support 1 and coaxially connected to the supporting stem 40 of the outdoor umbrella so as to selectively rotate the stem 40 of the outdoor umbrella, a locking member 5 connected to the engaging member 6 for selectively locking the engaging member 6 from being rotated, a paddle 4 operatively connected to the locking member 5 via a connecting arm 9, and a resilient element 7 mounted on the base support 1 and adapted for normally applying an urging force to the connecting member 5.

The stem rotary arrangement 2 further comprises means for engaging the engaging member 6 with the locking member 5, so as to block up a rotational movement of the engaging member 6 and therefore a rotational movement of the supporting stem 40 of the outdoor umbrella. The engaging means comprises a plurality of teeth radially and integrally formed on a bottom portion of the engaging member 6 and adapted for engaging with an engaging portion of the locking member 5. Once the engaging member 6 is engaged with the ldcking member 5, it will be locked up by the locking member 5 and is incapable of rotating.

The stem rotary arrangement 2 further comprises a plurality of rotary supports 3, such as a plurality of steel balls, operatively connected at the bottom portion of the engaging member 6 for rotatably supporting the engaging member 6 on the base support 1.

The paddle 4 is operatively connected to the locking member 5 via a connecting arm 9, so as to pivotally lift up the locking member 5 about a pivot from a normal locked position to an unlocked position. In the normal locked position, the locked member 5 is securely engaged with the bottom portion of the engaging member, so that the rotational motion of the engaging member 6 is locked up and the supporting stem 40 of the outdoor umbrella is rigidly mounted on the multi-functional adjustable umbrella base of the present invention. In the unlocked position, the engaging portion of the locking member 5 is pivotally lifted up by the connecting arm and disengaged from the engaging member 6. As a result, the engaging member is lifted from any blocking of its rotational movement. In other words, the engaging member 6 and the supporting stem 40 mounted thereon are capable of freely rotating.

In order to unlock the locking member 5 from the normal locked position, one has to step down the paddle 4 in order to lift up the engaging portion of the locking member 5 so as to disengage it from the engaging member 6. Then, the user can be readily to rotate the supporting stem 40 of the outdoors umbrella to a desired orientation.

The resilient element 7 of the stem rotary arrangement 2 is mounted on the pivot of the connecting arm 9 for normally applying an upward urging force to the connecting member 9. As a consequence, when the downward stepping force of the user is relieved, the resilient element 7 will push the connecting member 9 upwardly, so as to push the paddle upwardly to its original locked position. In other words, the resilient element 7 automatically depresses the engaging portion of the locking member 5 to engage with the bottom portion of the engaging member 6 by means of the connecting arm 9.

Accordingly, after the user has rotated the supporting stem 40 of the outdoor umbrella, he/she can simply relieve his/her downward stepping force and the locking member 5 automatically returns to its normal locked position. Note that the resilient element 7 mentioned above is a regular coil spring according to the first preferred embodiment of the present invention.

Figure 3:
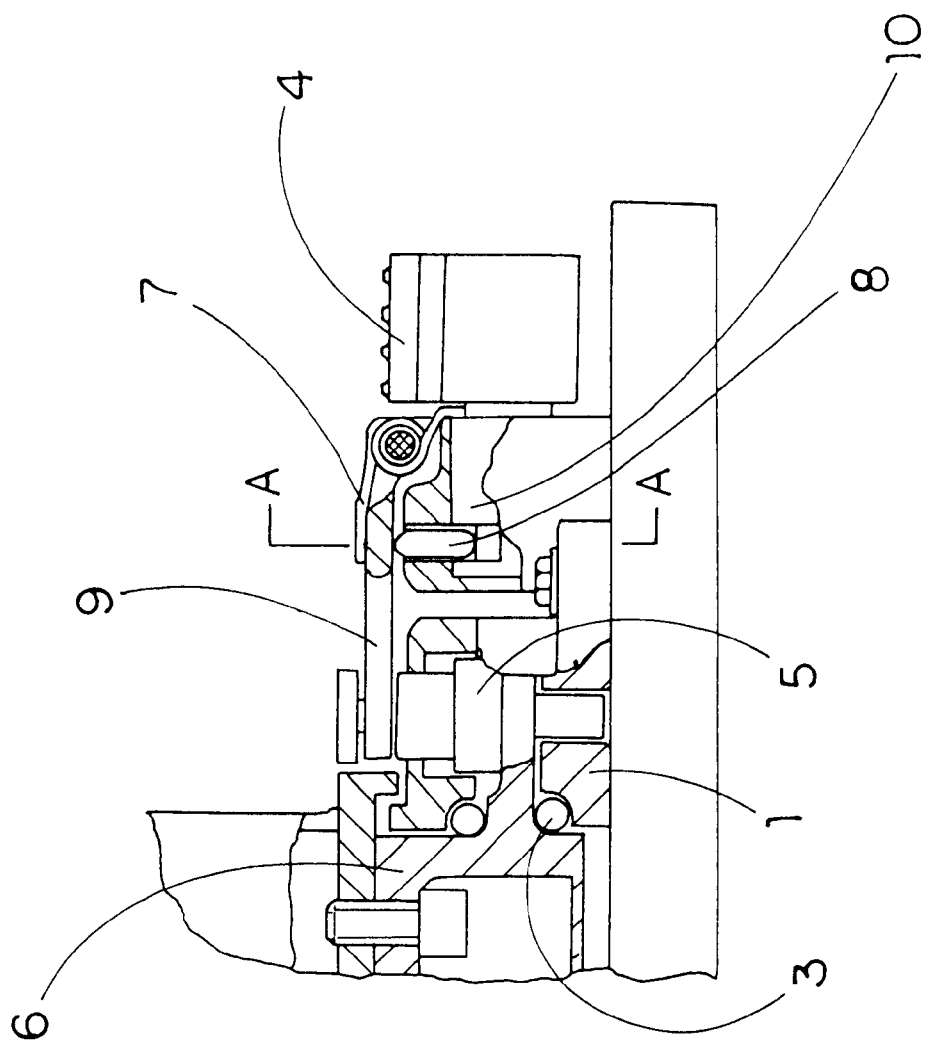
FIG. 3 is a partially sectional side view of a multi-functional adjustable umbrella base according to a second preferred embodiment of the present invention.

Referring to FIGS. 3–4 of the drawings, a multi-functional adjustable umbrella base according to a second preferred embodiment of the present invention is illustrated. The second preferred embodiment of the present invention is similar to that of the first preferred embodiment but with some additional elements. According to the second preferred embodiment of the present invention, the multi-functional adjustable umbrella base further comprises an operation housing 14' supported by the base support 1', an eccentric shaft 10' rotatably mounted in the operation housing 14', a first and a second biasing members 8' upwardly extended from two side portions, namely the first and the second side portion of the eccentric shaft 10' respectively, and adapted for biasing against the connecting arm 9', and another paddle 4', wherein the total of two paddles, the first and the second paddle are operatively connected to the first and the second side portions of the eccentric shaft 10' respectively. The connecting arm 9' is communicated with the operation housing 14' and operatively connected with the locking member 5' and is adapted for being lifted up by one of the biasing member 8' inside the operation housing 14'.

Normally, the locking member 5' is in locked position and the engaging portion of the locking member 5' is firmly engaged with the bottom potion of the engaging member 6' as to restrict any movement of the supporting stem 40' mounted thereon. To unlock the locking member 5', one has to step down either the first paddle 4' or the second paddle 4'. When the first paddle 4' is stepped downwardly, the first side portion of the eccentric shaft 10' is depressed downwardly, thus making the second side portion of the eccentric shaft 10' and the second biasing member 8' to move upwardly which then biases against and uplifts the connecting arm 9' so as to uplifts the engaging portion of the locking member 5' and disengage the locking member 5' from the engaging member 6'. On the other hand, when the second paddle 4' is stepped downwardly, the second side portion of the eccentric shaft 10' is depressed downwardly, thus making the first side portion of the eccentric shaft 10' and the first biasing member 8' to move upwardly which then biases against and uplifts the connecting arm 9' so as to uplifts the engaging portion of the locking member 5' and disengage the locking member 5' from the engaging member 6'. It is worth to mention that as a natural consequence of lifting up the second side portion of the eccentric shaft 10' when the first paddle 4' is stepped downwardly, the second paddle 4' is lifted up at the same time. Accordingly, when the second side portion is depressed, the first paddle 4' will be uplifted. In other words, when one user steps down either one of the paddle 4', the another paddle 4' will be lifted up and the locking member 5' reengage with the engaging member 6'.

The eccentric nature of the eccentric shaft 10' makes the eccentric shaft 10' remains in position even though the downward stepping force is relieved. This allows the user to walk away the paddle 4' that he/she has depressed, and adjust the supporting stem more conveniently and comfortably. To relock the locking member 5', the user has to depress the uplifting paddle 4' so as to depress the uplifted side portion of the eccentric shaft 10' until the two paddles 4' are at substantially the same height. In doing so, the originally uplifted biasing member 8' is then depressed into the operation housing 14' again and therefore bring down the connecting arms 9'. Then, the engaging portion of the locking member 5' is moved downwardly to reengage with the bottom portion of the engaging member 6' so as to relock the supporting stem 40' mounted thereon from any rotation.

What is claimed is:

1. A multi-functional adjustable base for an outdoor umbrella having a supporting stem, comprising:

a base support; and a stem rotary arrangement, which comprises:

an engaging member rotatably supported on said base support and firmly connected to the supporting stem of the outdoor umbrella;

a locking member supported on said base support and having an engaging portion adapted for selectively engaging with a bottom portion of said engaging member;

means for selectively engaging and disengaging said engaging member with said locking member; and a paddle operatively connected to said locking member and adapted for being driven between a locked position and an unlocked position, wherein in said locked position, said locking member is firmly engaged with said engaging member so as to restrict a rotational movement of said engaging member, and wherein in said unlocked position, said locking member disengages with said engaging member so that said engaging member is capable of freely rotating.

2. A multi-functional adjustable base for an outdoor umbrella having a supporting stem, as recited in claim 1, wherein said engaging means comprises a plurality of teeth radially and integrally formed on a bottom potion of said engaging member and adapted for engaging with said engaging portion of said locking member when said paddle is in locked position.

3. A multi-functional adjustable base for an outdoor umbrella having a supporting stem, as recited in claim 2, wherein said stem rotary arrangement further comprises a resilient element supported on said base support, and a connecting arm having a first end connected to said paddle and a second end connected to said engaging portion of said locking member, so that when said paddle is in said locked position, said engaging portion of said locking member is uplifted to disengage with said engaging member, and when said paddle is in said unlocked position, said second end of said connecting arm is depressed to lower said engaging portion of said locking member so as to securely engage said locking member with said engaging member, said resilient element being adapted for applying an urging force to said connecting arm so as to normally retain said paddle in a locked position.

4. A multi-functional adjustable base for an umbrella having a supporting stem, as recited in claim 3, wherein said stem rotary support further comprises a plurality of rotary supports operatively connected to said engaging member for rotatably supporting a rotational movement of said engaging member.

5. A multi-functional adjustable base for an umbrella having a supporting stem, as recited in claim 4, wherein said resilient element is a coil spring.

6. A multi-functional adjustable base for an umbrella having a supporting stem, as recited in claim 2, further comprising an operation housing supported by said base support, and wherein said stem rotary arrangement further comprises a connecting arm having a first end portion connected to said engaging portion of said locking member and a second end portion communicated with said operation housing, an eccentric shaft which has a first and a second side portion and rotatably mounted in said operation housing in such a manner that when said paddle is stepped downwardly, said first side portion of said eccentric shaft is rotatably depressed, and said second side portion is rotatably uplifted, and at least a first biasing member extended upwardly from said second side portion of said eccentric shaft, so that when said paddle is stepped downwardly, said biasing member is move upwardly so as to lift up said second end portion of said connecting arm, and lift up said engaging portion of said locking member to disengage said locking member from said engaging member.

7. A multi-functional adjustable base for an umbrella having a supporting stem, as recited in claim 6, wherein said stem rotary arrangement further comprises a second paddle operatively connected to said second side portion of said eccentric shaft, and a second biasing member upwardly extended from said first side portion of said eccentric shaft, so that when said second paddle is stepped downwardly, said second side portion of said eccentric shaft is rotatably depressed, uplifting said first side portion of said eccentric shaft and uplifting said second biasing member so as to bias against and uplift said second end portion of said connecting arm and disengage said engaging portion of said locking member from said engaging member.

8. A multi-functional adjustable base for an umbrella having a supporting stem, as recited in claim 7, wherein said stem rotary support further comprises a plurality of rotary supports operatively connected to said engaging member for rotatably supporting a rotational movement of said engaging member.

9. A multi-functional adjustable base for an umbrella having a supporting stem, as recited in claim 6, wherein said stem rotary support further comprises a plurality of rotary supports operatively connected to said engaging member for rotatably supporting a rotational movement of said engaging member.

10. A multi-functional adjustable base for an outdoor umbrella having a supporting stem, as recited in claim 1, wherein said stem rotary arrangement further comprises a resilient element supported on said base support, and a connecting arm having a first end connected to said paddle and a second end connected to said engaging portion of said locking member, so that when said paddle is in said locked position, said engaging portion of said locking member is uplifted to disengage with said engaging member, and when said paddle is in said unlocked position, said second end of said connecting arm is depressed to lower said engaging portion of said locking member so as to securely engage said locking member with said engaging member, said resilient element being adapted for applying an urging force to said connecting arm so as to normally retain said paddle in a locked position.

11. A multi-functional adjustable base for an umbrella having a supporting stem, as recited in claim 10, wherein said stem rotary support further comprises a plurality of rotary supports operatively connected to said engaging member for rotatably supporting a rotational movement of said engaging member.

12. A multi-functional adjustable base for an umbrella having a supporting stem, as recited in claim 11, wherein said resilient element is a coil spring.

* * * * *